Patented Feb. 23, 1937

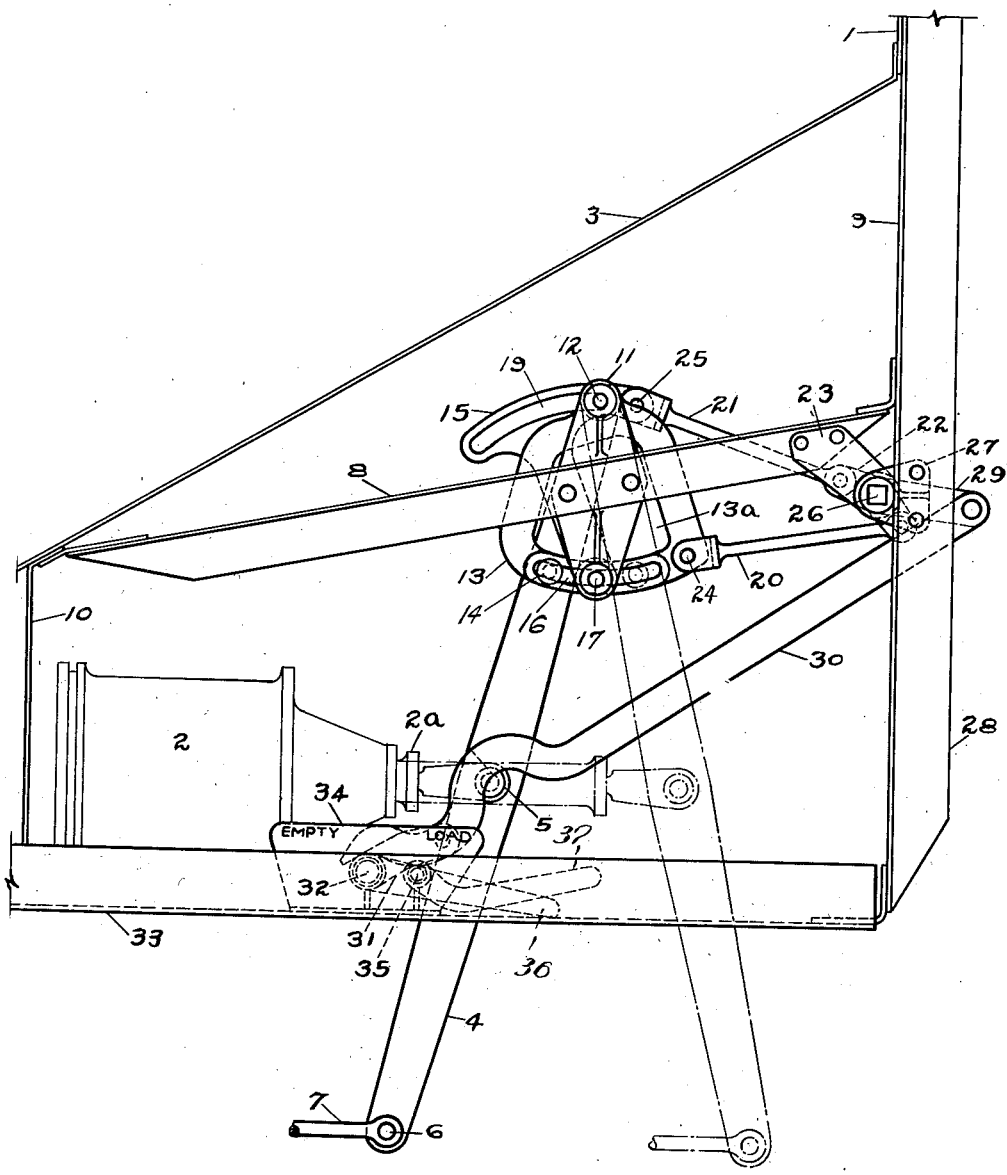

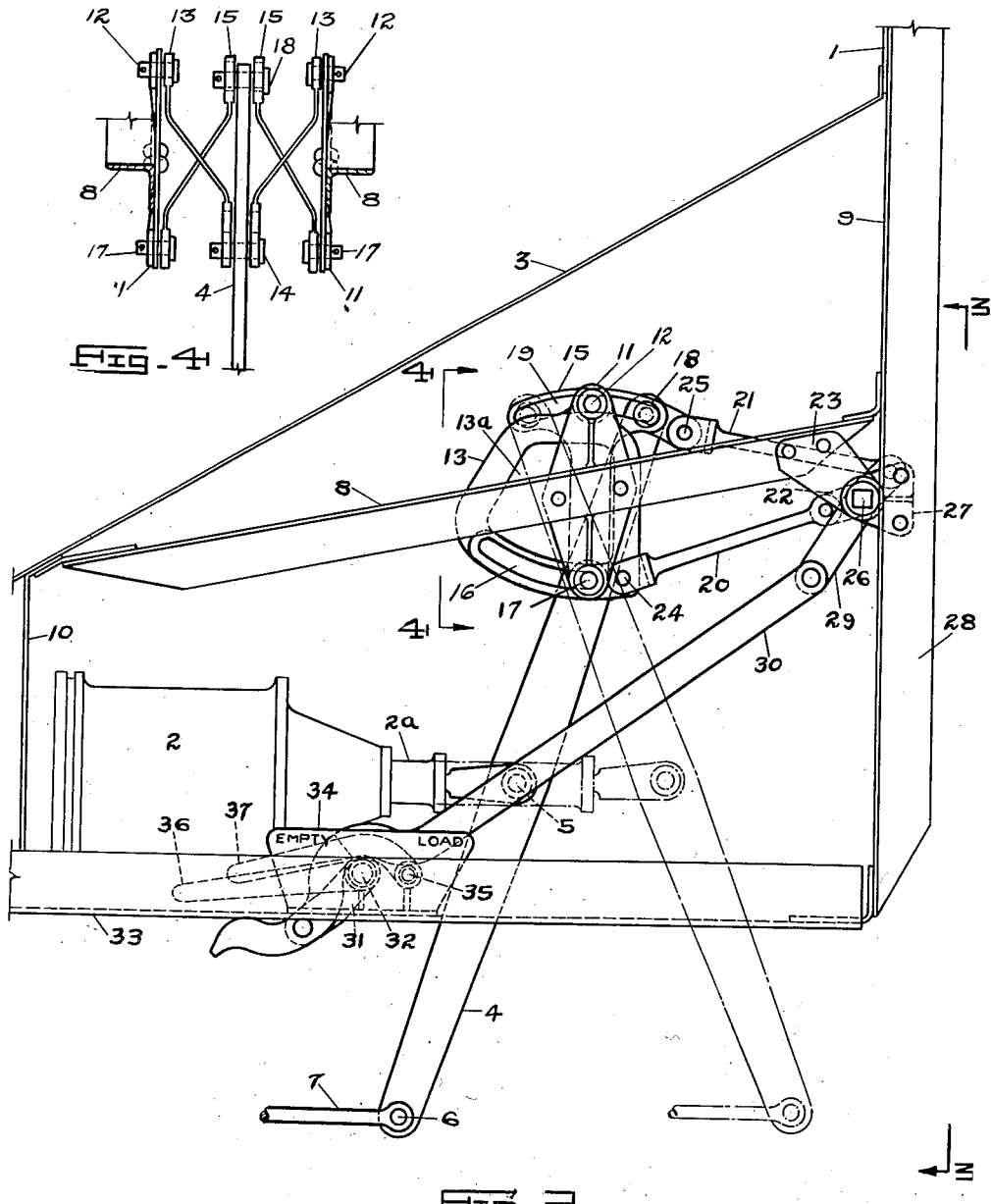

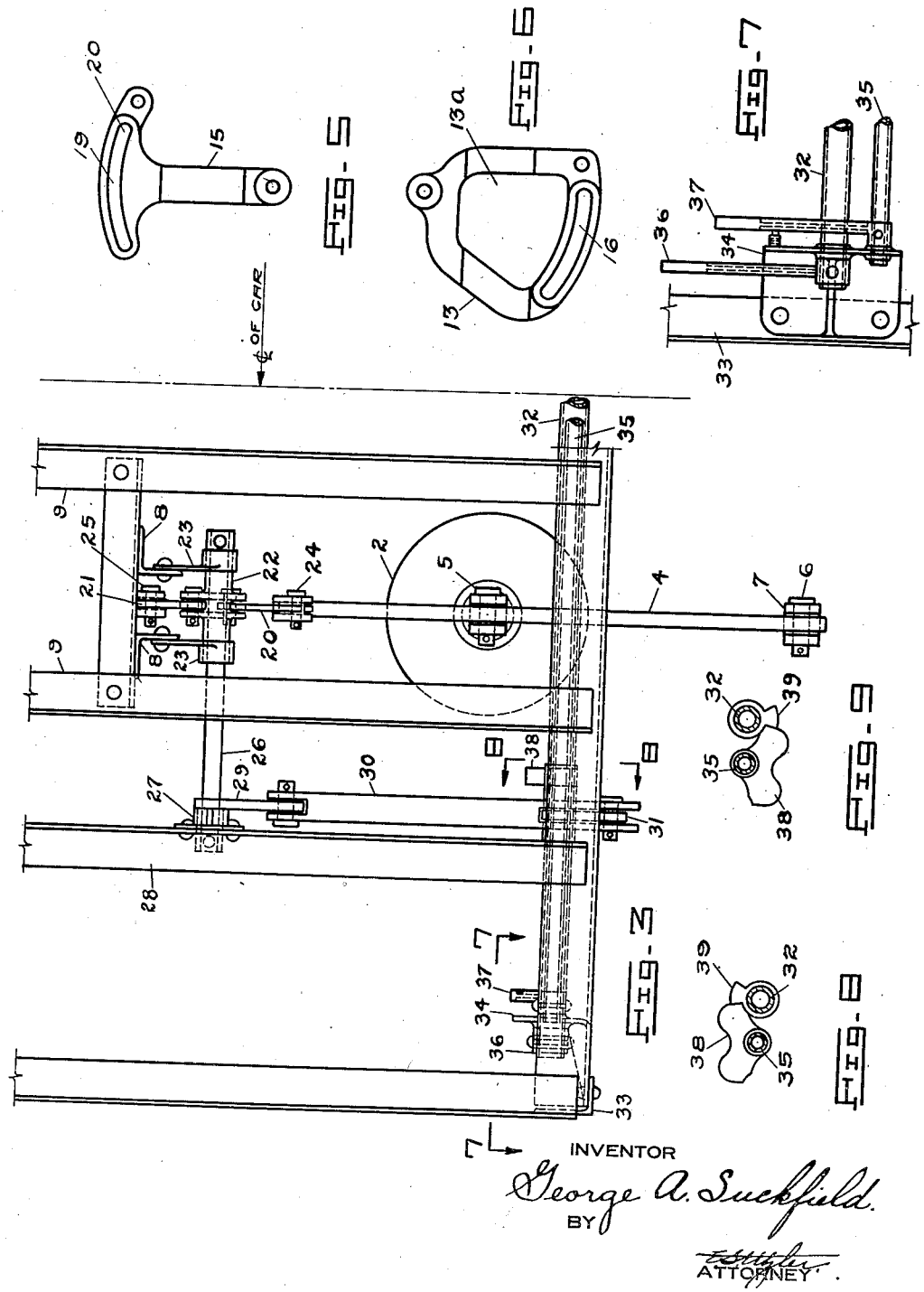

2,071,587

UNITED STATES PATENT OFFICE 2,071,587

CAR BRAKE

George A. Suckfield, Avalon, Pa., assignor to Pressed Steel Car Company, Pittsburgh, Pa., a corporation of New Jersey Application October 22, 1935, Serial No. 46,226

17 Claims. (Cl. 188—195)

The invention pertains to brakes for railway cars and particularly the brake as applied to an open top railway car, such as a hopper car, and has for its object the provision of means for changing the fulcrum of the brake cylinder lever to obtain "empty" and "load" applications of the brake shoes.

Another object of the invention lies in the simplicity of means for changing the fulcrum point of the said brake cylinder lever and the ease of operation.

The recent advances in the design of freight cars resulting in the reduction in the weight of the car necessary to carry a given load has resulted in a condition whereby when the brake system is provided with sufficient retarding effort to stop a loaded car the same application of the brakes to the car when empty, results in sliding or locking the wheels causing flat spots on the wheels and oftentimes injury to the unloaded car when it is disposed between loaded cars in a train.

In the drawings forming a part of this specification, Fig. 1 shows a side elevation of a portion of a railway car embodying the invention and set for a "load" application of the brakes; Fig. 2 is a view similar to Fig. 1 with the invention set for an "empty" application of the brakes; Fig. 3 shows an end elevation of the car and the invention; Fig. 4 shows a section on lines 4—4 of Fig. 2; Figs. 5 and 6 show details of the invention; Figs. 7, 8 and 9 show details of the locking mechanism as indicated by lines 7—7 and 8—8 of Fig. 3.

Referring now in detail to the drawings, reference character 1 indicates a portion of the end of a hopper car having the brake cylinder 2 disposed beneath the sloping floor 3 at the end of the car, said cylinder having a piston 2ª extending outwardly from the cylinder and having a clevis embracing the cylinder brake lever 4 and connected thereto by means of the pin 5. Adjacent the lower end of the lever 4 is a pin 6 connecting the lever to a pull rod 7 extending to the usual brake rigging and actuating the brake shoes (not shown). The upper end of the lever 4 is suspended from a change over device supported between the members 8 extending between the end post 9 and the bolster 10 of the car.

Said change over device comprises a pair of bearing plates 11 secured between the members 8 and projecting above and below each of the said members. Pivotally mounted adjacent the upper end of each bearing plate 11 upon pins 12 are arms 13 having the portion thereof receiving the pin 12 disposed adjacent the bearing plate 11, thence extending downwardly and inwardly, thence downwardly to engage the lever 4, the lower ends of the arms 13 lying on opposite sides of the lever 4 and pivotally connected thereto by means of the pin 14. Each arm 13 has a suitably disposed aperture 13ª permitting the passage of the arm 15, to be hereinafter described. The portion of the member 13 at its connection to the lever 4 has an elongated aperture 16 extending in the direction of travel of the lever 4, one end of said aperture 16 providing a bearing for the pin 14 and acting as a support for the lever 4 when an "empty" application of the brakes is made, the remaining portions of the aperture 16 being preferably of greater width than the diameter of the pin 14 to permit free movement of the pin 14 and lever 4 during a "load" application of the brakes. Pivotally connected adjacent the lower portion of each bearing plate 11 upon the pins 17 are the members 15 having a portion lying against the bearing plate 11, thence extending upwardly and inwardly through the aperture in the members 13 to lie against the upper end of the brake lever 4 and connected thereto by means of the pin 18. Each member 15 is substantially in the shape of a T having the stem connected to the pin 17 and the head engaging the pin 18, said head being formed on the arc of a circle struck from the center of the pin 17 and having an aperture 19 extending longitudinally of the head. At one end 20 of the aperture 19 is provided a bearing for the pin 18 forming the fulcrum point of the lever 4 when a "load" application of the brake is made, the remaining portions of the aperture 19 being preferably of greater width than the diameter of the body of the pin 18, to permit free movement of the lever and pin when an "empty" application of the brake is made.

For selectively manipulating the change-over device, arms 20 and 21 are mounted on a crank 22 journaled in bearings 23 secured to the members 8. Arm 20 being connected by means of pin 24 to arms 13 of the change-over device and arm 21 being connected by means of pin 25 to arms 15 of the device. Crank 22 is rigidly mounted on shaft 26 which is journaled in bearings 23 secured to end posts 9 and bearing 27 secured to end post 28. Shaft 26 is actuated by crank 29 rigid with the shaft and pin connected to link 30 which latter is in turn pin connected to crank 31 which is rigid with shaft 32 extending transversely of the car, adjacent the car side sills 33, and journaled in bearings 34 secured to said sills. Link 30 is offset intermediate its connection to cranks 29 and 31 for a purpose hereinafter set forth. A locking shaft 35 extends transversely of the car and is journaled in the bearings 34. Operating handles 36 and 37 are secured to opposite ends of shafts 32 and 35 respectively for manipulation of the change-over device from either side of the car. Shaft 35 being provided with lug 38 projecting from diametrically opposite sides thereof and shaft 32 being provided with latch 39 adapted to engage either side of lug 38 to lock shaft 32 in "empty" or "load" position. Suitable markings on bearings 34 cooperate with handle 36 to indicate the position of the change-over device.

The theory of operation of the above described specific embodiment of the invention is that the live brake lever 4 fulcrums selectively upon the pins 14 or 18 to exert different forces on the brake rod 7 whilst the same effort is exerted on the brake lever through the brake cylinder 2 and its attached push rod. Many obvious changes will suggest themselves to those skilled in the art in the manner of supporting the brake lever 4 on its fulcrum pins 14 and 18 to permit relative movement between either of the pins and their support when the other pin is selected as the fulcrum point for the lever during the application of the brakes, and it is to be understood that no limitations are to be imposed by the before described specific embodiment of the invention except as contained in the hereinafter appended claims.

The operation of the described specific embodiment of the invention is as follows: referring now to Fig. 1 where the mechanism is set for a "load" application of the brakes, operating handles 36 and 37 in the position shown in Fig. 1 bring the latching arrangement into the position as shown by Fig. 9 of the drawings and prevent movement of operating handle 36 actuating the change-over device until after locking arm 37 is released. It will be noted that the arm 37 is disposed beneath the wording "load" on bearing 34 indicating the nature of the brake application which will result from admission of fluid pressure to the brake cylinder 2. With the operating arms in this position, it will be noted that the tail portion of link 30 is engaged with the shaft 32 limiting further rotation of handle 36 and rigidly holding the change-over arms 13 and 15 in the position shown. The arm 20 secured to change-over arm 13, has positioned the aperture therein so as to permit free movement of pin 14 of the lever 4 within the aperture throughout the entire application and release of the brakes. Arm 21 has moved change-over arm 15 to the left and engaged pin 18 of lever 4 in the bearing on the extreme right of the aperture in arm 15.

Obviously, then, upon an application of the brakes, brake cylinder push rod 2ª moving to the right, tends to move brake lever 4 bodily to the right, and is resisted by the pin 18 in the aperture in the member 15 causing brake lever 4 to fulcrum about pin 18 situated adjacent the end of the lever 4 giving the greatest effort on the pull rod 7 which is possible with the brake lever 4 due to the fixed relationship between the pins 5 and 6 securing the brake lever 4 to the push rod 2ª and brake rod 7. As illustrated in dot and dash lines on Fig. 1 of the drawings, when the brakes are fully applied fulcrum pin 14 rides freely in the aperture of change-over arm 13. When the fluid pressure within the brake cylinder 2 is reduced the brake lever 4 is moved by the brake rigging to the release position shown in full lines on Fig. 1, ready for a new "load" application of the brakes.

When it is desired to set the mechanism for an "empty" application of the brakes, operating handles 36 and 37 are rotated in a counter-clockwise direction to bring the latching mechanism into position shown by Fig. 8 of the drawings and the operating handles in position shown by Fig. 2 of the drawings, resulting in a clockwise rotation of crank 22 secured to the shaft 26 upon actuation by link 30 causing change-over arm 15 to move to the right and change-over arm 13 to move to the left bringing fulcrum pin 14 of the lever 4 into the bearing at the end of the aperture in the change-over arm 13. Obviously, then, an application of the brakes through the brake cylinder push rod 2ª causes the lever 4 to fulcrum on its pin 14 on the change-over arm 13 and the fulcrum pin 18 moves freely in the aperture of the change-over arm 15. When the brakes are fully applied the brake lever 4ª is in the position shown in dot and dash lines, after a release of the fluid pressure in the brake cylinder 2ª the brake lever 4 returns to the position shown in full lines, on Fig. 2.

Having thus described the invention what I claim as new and desire to secure by Letters Patent is:

1. In an empty and load brake mechanism, the combination of a brake lever, a lever actuating means, a fulcrum support for the lever, a plurality of fulcrum pins on the lever having permanent connection with the fulcrum support and means associated with said fulcrum support for selectively moving the support for securing one of said pins in fixed relation to the support to provide a fulcrum for the lever when acted on by said actuating means.

2. In an empty and load brake mechanism, the combination with a brake lever and brake lever actuating means, of a plurality of fulcrum pins on the lever, a support for said lever engaging said pins and means for positioning said support whereby one of said pins is restricted in movement relative to the support and serves as a fulcrum point for the brake lever when moved by the actuating means.

3. In an empty and load brake mechanism, the combination with a brake lever and actuating means therefor, of a change-over device for said lever comprising a stationary member, arms pivotally mounted on opposite ends of the stationary member and extending to said brake lever, spaced fulcrum pins adjacent one end of the brake lever, an elongated aperture in the free end of each arm engaging one of said pins and means for alternately positioning said arms to limit relative movement between one of said pins and its associated apertured arm whilst permitting free movement of the other pin in the other apertured arm.

4. In an empty and load brake in combination, a brake lever, a brake lever actuating means, and a brake lever support comprising a rigid member, oppositely disposed change-over arms, each having one end pivotally connected to the rigid member and the other ends disposed in spaced relation adjacent said lever, an elongated aperture in the end of each arm disposed adjacent said lever, spaced fulcrum pins mounted on said lever and disposed within said apertures, a bearing at one side of each aperture for its associated fulcrum pin, and means for alternately moving said arms to engage one fulcrum pin on said lever with its respective bearing in the associated arm.

5. In an empty and load brake mechanism, the combination of a brake lever, brake lever actuating means, spaced fulcrum pins mounted on the lever adjacent one end thereof, a support for said lever including pivotally mounted arms having elongated apertures therein engaging said fulcrum pins and means for manipulating said arms to alternately fulcrum said lever about one of said pins when the lever is moved by the actuating means.

6. The combination, with the brake mechanism of a railway hopper car having the brake cylinder beneath the sloping floor at one end of the car, of a substantially vertically disposed brake lever connected intermediate its ends to the brake cylinder, a fulcrum support for said lever adjacent the upper end thereof including a plurality of arms pivotally mounted on the car and connected to the lever by fulcrum pins spaced longitudinally of the lever, a crank mounted on the car and for alternately connecting one of said arms and one fulcrum pin to provide a fulcrum for said lever and a locking device mounted on the car and associated with said crank.

7. In a railway car having a brake system, in combination, a live brake lever, an actuating means for the lever, a connection at one end of the lever to a brake applying means, and a fulcrum for the opposite end of said lever comprising a fulcrum support mounted on the car, a bearing plate mounted on the support on opposite sides of the lever, a pair of fulcrum arms at each side of the lever, one end of each of said arms having separate connections with said bearing plate, the opposite ends of said members connecting with spaced fulcrum pins extending transversely of the lever, means on said arms providing limited relative movement thereof at said fulcrum pin connections and means for positioning said arms to selectively secure the arms connected to one of said fulcrum pins in fixed relation to the pin.

8. In a railway car having a brake system in combination, a live brake lever, actuating means for the lever, a connection at one end of the lever to a brake applying means, and a fulcrum for the opposite end of the lever comprising a fulcrum support mounted on the car, a bearing plate at each side of the lever and secured to the support, an apertured fulcrum arm at each side of the lever having its outer end pivoted to the adjacent bearing plate and its inner end connected to a fulcrum pin mounted on the lever, a second fulcrum arm at each side of the lever and extending through the aperture of the adjacent fulcrum arm, a pivotal connection between the outer end of said second arm and the bearing plate below the pivotal connection of the first arm, a connection between the inner end of the second fulcrum arm and a second fulcrum pin in the lever, means on the fulcrum arms providing limited relative movement between each pair of fulcrum arms and their associated fulcrum pin and means for selectively moving said pairs of arms to fix one of said pairs of arms relative to its associated fulcrum pin to provide a fulcrum support for the lever when actuated to apply the brakes.

9. In a railway car having a brake system in combination, a brake lever, actuating means for the lever, brake applying means connected to one end of the lever, a fulcrum for the opposite end of the lever comprising a fulcrum support mounted on the car, a bearing plate secured to the support on opposite sides of the lever, a fulcrum arm pivoted adjacent an end of each of said bearing plates and having an apertured elongated inner portion disposed adjacent the lever, a fulcrum pin mounted in the lever and engaging with the said apertured portions of the fulcrum arms, a fulcrum arm pivoted adjacent the other ends of each of said bearing plates and having an apertured elongated inner portion disposed adjacent the lever, a second fulcrum pin mounted in the lever and seating within the last named apertures and means positioning said pairs of arms to select one of said pins as a fulcrum for the lever.

10. In a railway car having a brake system in combination, a brake lever, actuating means for the lever, a brake applying means connected to one end of the lever, a fulcrum for the opposite end of the lever, said fulcrum including two pairs of fulcrum arms mounted on the car and permanently connected to spaced fulcrum pins on the lever, each connection having means associated therewith to provide relative bodily movement between the fulcrum pin and its associated pair of arms and means for selectively providing for pivotal movement of the lever about the pin and one of said pairs of arms.

11. In a railway car having a brake system, in combination, a brake lever, actuating means for the lever, a connection between one end of the lever and a brake applying means, and a fulcrum connection for the opposite end of the lever, said fulcrum connection including spaced fulcrum pins in the lever, a fulcrum arm connected to each pin and to the car and means for selecting one of said pins as a fulcrum point for the lever to secure different forces in the brake applying means with the same actuating force applied to the lever.

12. In a railway car having a brake system including a brake cylinder having a fluid pressure actuated push rod, a live lever connected to the push rod, one end of the lever being connected to the brake applying means, the other end being connected to a means providing a fulcrum for said lever when actuated by said push rod, said means comprising a bracket mounted on the car and disposed on opposite sides of the lever, a fulcrum arm pivotally connected adjacent the upper end of each bracket and extending downwardly to the lever, a fulcrum arm pivotally connected adjacent the lower end of each bracket and extending upwardly to adjacent the lever, one of said arms at each side of the bracket having a suitable aperture intermediate its ends through which the other of said fulcrum arms extends, fulcrum pins connecting the upper and lower ends of the fulcrum arms to the brake lever and means operatively associated with the fulcrum arms to selectively position the arms to provide an effective fulcrum for the lever.

13. In a railway car, a brake system including a cylinder having a fluid pressure actuated push rod, a brake lever connected intermediate its ends with the push rod, one end of said lever being connected to the brake applying means, the opposite end being connected to a fulcrum device upon which the lever pivots when actuated by the push rod, said device including a plurality of pairs of arms pivotally connected to the car and permanently connected to the levers to provide a fulcrum support therefor, and means for operating the arms to selectively render one of said fulcrum supports ineffective.

14. In a railway car, a brake system including a brake lever, a brake applying means connected to one end of the lever, means for actuating said lever connected intermediate the ends of the lever, the combination of a fulcruming device connecting the other end of the lever to the car, said device comprising members disposed on opposite sides of the lever, one end of each said members being pivotally connected to the car, the other end having an elongated aperture therein extending transversely of the lever, and a fulcrum pin journaled in the lever and seated in the said apertures on opposite sides of the lever, second pair of members disposed one on each side of the lever, each having one end pivotally connected to the car, the other end being disposed adjacent the lever and having an elongated aperture therein disposed transversely of the lever, a fulcrum pin journaled in the lever in spaced relation to the first-named fulcrum pin and having its opposite end seated in the said apertures of the second named members, and means for alternately moving the said members to cause the fulcrum pin engaging the apertures therein to seat at one end of the aperture.

15. In a railway car, the combination in a brake system therefor, of a brake lever, means connected to the lever for actuation thereof, a connection at one end of the lever to the brake applying means and a fulcrum support for the opposite end of the lever, said fulcrum support including a bracket mounted on the car at each side of the lever, fulcrum arms having one end pivotally connected in spaced relation to each bracket, the opposite ends of said arms being permanently connected in spaced relation on the lever, means on each arm at its connection to the lever providing for relative movement between the fulcrum arm and lever, and means mounted on the car and associated with each arm for selectively restricting relative movement between the lever and one of its connections to said fulcrum arms.

16. In a railroad car, the combination in a brake system therefor, of a brake lever, means for imparting movement to said lever, a connection between one end of said lever and the brake applying means, a fulcrum device for the opposite end of said lever comprising a plurality of pairs of arms pivotally mounted on the car and connected to the lever so as to form alternate fulcrum supports for the lever at different points along the length thereof, a shaft journaled to the car adjacent said pairs of arms, a plurality of cranks mounted on the shaft, one of said cranks being connected to each pair of fulcrum arms, and means for manipulating the shaft to selectively position the pairs of arms to act as fulcrums for the lever.

17. In a railroad car, the combination in a brake system therefor, of a brake lever, means for imparting movement to said lever, a connection between one end of said lever and the brake applying means, a fulcrum device for the opposite end of said lever comprising a plurality of pairs of arms pivotally mounted on the car and connected to the lever so as to form alternate fulcrum supports for the lever at different points along the length thereof, a shaft journaled to the car adjacent said pairs of arms, a crank mounted on the shaft and connected to each pair of fulcrum arms, an operating crank mounted on the shaft in spaced relation to said first-named crank, a shaft journaled on the car in spaced relation to said first-named shaft, an operating crank mounted on said shaft, a link pivotally connecting said operating cranks, an operating handle on said second named shaft for imparting movement to the operating cranks to position said fulcrum arms.

GEORGE A. SUCKFIELD.